United States Patent Office.

OTTO BONHOEFFER, OF ELBERFELD, GERMANY, ASSIGNOR TO THE FARBENFABRIKEN OF ELBERFELD COMPANY, OF NEW YORK.

PROPIONYL-SALICYLIC ACID AND PROCESS OF MAKING SAME.

SPECIFICATION forming part of Letters Patent No. 656,435, dated August 21, 1900.

Application filed October 23, 1899. Serial No. 734,544. (Specimens.)

*To all whom it may concern:*

Be it known that I, OTTO BONHOEFFER, doctor of philosophy and chemist, residing at Elberfeld, Germany, (assignor to the FARBENFABRIKEN OF ELBERFELD COMPANY, OF NEW YORK,) have invented a new and useful Improvement in the Manufacture of Pharmaceutical Compounds, of which the following is a specification.

My invention relates to the preparation of a new pharmaceutical product which is chemically propionylsalicylic acid having the formula

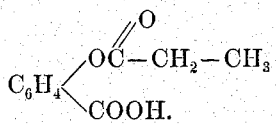

According to my researches this product possesses valuable therapeutic properties and is suitable for use as a medicine for gouty rheumatism.

The process for producing my new compound consists in allowing propionic anhydride to act on salicylic acid in a suitable manner.

In order to carry out my process practically, I can, for instance, proceed as follows: Twenty parts, by weight, of salicylic acid are dissolved in forty parts, by weight, of propionic anhydride by heating on a water-bath. To the solution thus obtained 0.2 parts, by weight, of concentrated sulfuric acid are added with continuous stirring. The reaction begins instantly and is finished after further heating on the water-bath for about one hour under stirring. Subsequently the excess of anhydride and the propionic acid formed during the reaction are for the most part distilled over at a low temperature. The pure propionylsalicylic acid remains in the shape of white glittering small leaves melting at 95° centigrade. The propionylsalicylic acid thus produced is soluble in water with difficulty. When boiled for a while with water, it is split up, salicylic and propionic acid being produced. It is likewise decomposed by the action of alkalies. The new acid thus produced is soluble in alcohol, benzene, ether, and chloroform. When ground, it represents a white crystalline powder. Ferric chlorid does not produce a violet color in the watery solution of the propionylsalicylic acid, as it is the case when using ferric chlorid and watery solutions of salicylic acid.

According to my investigations the new compound possesses valuable therapeutic properties and can be used in medicine for gouty rheumatism.

Having now described my invention and in what manner the same is to be performed, what I claim as new, and desire to secure by Letters Patent, is—

1. The process for the production of propionylsalicylic acid which process consists in, first, allowing propionic anhydride to act on salicylic acid; secondly, isolating the so-formed propionylsalicylic acid, substantially as hereinbefore described.

2. As a new article of manufacture the propionylsalicylic acid having the formula

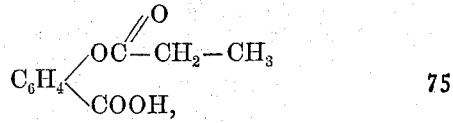

forming white glittering leaves melting at 95° centigrade, being soluble in water with difficulty, soluble in alcohol, benzene, ether and chloroform, being split by a prolonged heating with water into its two component parts, being likewise decomposed by a treatment with alkalies, giving contrary to salicylic acid no violet color when its watery solution is mixed with ferric chlorid and representing a valuable medicine for gouty rheumatism, substantially as hereinbefore described.

In testimony whereof I have signed my name in the presence of two subscribing witnesses.

OTTO BONHOEFFER.

Witnesses:
 R. E. JAHN,
 OTTO KÖNIG.